US012811948B2

(12) United States Patent
Hadley et al.

(10) Patent No.: US 12,811,948 B2
(45) **Date of Patent: *Nov. 24, 2026**

(54) GROUP TRAVEL BETWEEN ARTIFICIAL REALITY DESTINATIONS

(71) Applicant: Meta Platforms Technologies, LLC, Menlo Park, CA (US)

(72) Inventors: Michael Hadley, Los Angeles, CA (US); Danyang Zhao, San Mateo, CA (US); Patrick McGartoll, Sunnyvale, CA (US); Nicolas Sleiman Machado, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 19/003,779

(22) Filed: Dec. 27, 2024

(65) Prior Publication Data

US 2025/0220023 A1 Jul. 3, 2025

Related U.S. Application Data

(63) Continuation of application No. 18/045,203, filed on Oct. 10, 2022, now Pat. No. 12,218,944.

(51) Int. Cl.
*H04L 9/40* (2022.01)
*G06F 3/01* (2006.01)
(Continued)

(52) U.S. Cl.
CPC ............ *H04L 63/104* (2013.01); *G06F 3/011* (2013.01); *G06F 21/10* (2013.01); *G06T 19/00* (2013.01);
(Continued)

(58) Field of Classification Search
CPC ... H04L 63/104; H04L 63/102; H04L 67/131; G06F 3/011; G06F 21/10; G06T 19/00; G06T 2219/024
See application file for complete search history.

(56) References Cited

U.S. PATENT DOCUMENTS

| | | | |
|---|---|---|---|
| 6,842,175 | B1 | 1/2005 | Schmalstieg et al. |
| 7,701,439 | B2 | 4/2010 | Hillis et al. |

(Continued)

FOREIGN PATENT DOCUMENTS

| | | | |
|---|---|---|---|
| CN | 101996077 | A | 3/2011 |
| CN | 107533230 | A | 1/2018 |

(Continued)

OTHER PUBLICATIONS

International Preliminary Report on Patentability for International Application No. PCT/US2023/032524, mailed Apr. 10, 2025, 8 pages.

(Continued)

*Primary Examiner* — J. Brant Murphy
(74) *Attorney, Agent, or Firm* — Potomac Law Group, PLLC; Dannon G. Allbee

(57) ABSTRACT

Aspects of the present disclosure are directed to group travel between artificial reality (XR) destinations. Currently, users in an artificial reality (XR) experience cannot travel with a group to a specific destination or between destinations (e.g., to and from virtual worlds, levels, applications, etc.). Thus, some implementations assign users within a group in a multiplayer XR experience (e.g., a virtual lobby) a same session identifier. When the users select a destination, some implementations can provide a computing system hosting the destination with the session identifier associated with the users, such that the hosting computing system can ensure that the users travel to the same instance of the destination together. If a user does not already have the destination
(Continued)

installed, some implementations can allow the user to acquire access rights to the destination, then travel to the same instance of the destination as the other users.

20 Claims, 11 Drawing Sheets

(51) Int. Cl.
*G06F 21/10* (2013.01)
*G06T 19/00* (2011.01)
*H04L 67/131* (2022.01)

(52) U.S. Cl.
CPC .......... *H04L 63/102* (2013.01); *H04L 67/131* (2022.05); *G06T 2219/024* (2013.01)

(56) References Cited

U.S. PATENT DOCUMENTS 8,424,075 B1 4/2013 Walsh et al.
D683,749 S 6/2013 Hally
D689,874 S 9/2013 Brinda et al.
8,947,351 B1 2/2015 Noble
D726,219 S 4/2015 Chaudhri et al.
D727,352 S 4/2015 Ray et al.
D727,354 S 4/2015 Park et al.
D733,740 S 7/2015 Lee et al.
9,117,274 B2 8/2015 Liao et al.
9,292,089 B1 3/2016 Sadek
D761,273 S 7/2016 Kim et al.
D763,279 S 8/2016 Jou
9,477,368 B1 10/2016 Filip et al.
D775,179 S 12/2016 Kimura et al.
D775,196 S 12/2016 Huang et al.
D780,794 S 3/2017 Kisielius et al.
D781,905 S 3/2017 Nakaguchi et al.
D783,037 S 4/2017 Hariharan et al.
D784,394 S 4/2017 Laing et al.
D784,395 S 4/2017 Laing et al.
D787,527 S 5/2017 Wilberding
D788,136 S 5/2017 Jaini et al.
D788,793 S 6/2017 Ogundokun et al.
D789,416 S 6/2017 Baluja et al.
D789,977 S 6/2017 Mijatovic et al.
D790,567 S 6/2017 Su et al.
D791,823 S 7/2017 Zhou
D793,403 S 8/2017 Cross et al.
9,817,472 B2 11/2017 Lee et al.
D817,994 S 5/2018 Jou
D819,065 S 5/2018 Xie et al.
D824,951 S 8/2018 Kolbrener et al.
D828,381 S 9/2018 Lee et al.
D829,231 S 9/2018 Hess et al.
D831,681 S 10/2018 Eilertsen
D835,665 S 12/2018 Kimura et al.
10,168,768 B1 1/2019 Kinstner
D842,889 S 3/2019 Krainer et al.
10,220,303 B1 3/2019 Schmidt et al.
10,248,284 B2 4/2019 Itani et al.
D848,474 S 5/2019 Baumez et al.
D850,468 S 6/2019 Malahy et al.
D851,123 S 6/2019 Turner
D853,431 S 7/2019 Sagrillo et al.
D854,551 S 7/2019 Pistiner et al.
D856,366 S 8/2019 Richardson
D859,426 S 9/2019 Poes
10,473,935 B1 11/2019 Gribetz et al.
10,521,944 B2 12/2019 Sareen et al.
10,592,064 B2 * 3/2020 Ames .................... G06F 1/1694
10,665,019 B2 * 5/2020 Hildreth ................ G06T 19/006
D888,071 S 6/2020 Wilberding
D900,123 S 10/2020 Lopes
D908,713 S 1/2021 Fremine et al.
D910,655 S 2/2021 Matthewman et al.
D910,660 S 2/2021 Chaturvedi et al.
10,916,220 B2 2/2021 Ngo
10,948,997 B1 * 3/2021 Victor-Faichney ..... G06F 3/017
10,987,573 B2 4/2021 Nietfeld et al.
11,086,476 B2 8/2021 Inch et al.
11,164,378 B1 11/2021 Cowen et al.
11,380,021 B2 7/2022 Nakata
11,520,707 B2 * 12/2022 Satpathy ............. G06F 12/1433
11,556,169 B2 1/2023 Wallen et al.
11,556,220 B1 1/2023 Inch et al.
11,676,351 B1 6/2023 Yang et al.
11,755,180 B1 9/2023 Edelblut et al.
11,836,205 B2 12/2023 Inch et al.
11,928,314 B2 3/2024 Edelblut et al.
12,218,944 B1 2/2025 Hadley et al.
2002/0073043 A1 6/2002 Herman et al.
2005/0060661 A1 3/2005 Kawahara et al.
2008/0089587 A1 4/2008 Kim et al.
2008/0155118 A1 * 6/2008 Glaser ................. H04L 67/1095
709/238
2009/0103780 A1 * 4/2009 Nishihara ............ G06F 3/0425
382/103
2009/0279784 A1 * 11/2009 Arcas ...................... G06T 19/20
382/190
2010/0005424 A1 1/2010 Sundaresan et al.
2010/0050219 A1 * 2/2010 Angiolillo ........ H04N 21/42204
725/100
2010/0070859 A1 3/2010 Shuster et al.
2010/0083112 A1 4/2010 Dawson et al.
2010/0169837 A1 * 7/2010 Hyndman ........... G06F 16/9566
715/848
2010/0208033 A1 * 8/2010 Edge ..................... G06T 19/006
348/46
2010/0306716 A1 12/2010 Perez
2010/0332996 A1 * 12/2010 Sarkaria ............ H04M 1/72406
709/219
2010/0332997 A1 * 12/2010 Hamilton, II ....... G06F 21/6218
707/812
2011/0055090 A1 3/2011 Ross
2011/0161843 A1 6/2011 Bennett et al.
2011/0164269 A1 7/2011 Kamishiro
2011/0267265 A1 11/2011 Stinson
2011/0276477 A1 11/2011 Shuster
2011/0302535 A1 12/2011 Clerc et al.
2012/0069168 A1 3/2012 Huang et al.
2012/0115122 A1 5/2012 Bruce et al.
2012/0143358 A1 6/2012 Adams et al.
2012/0206345 A1 8/2012 Langridge
2012/0249797 A1 * 10/2012 Haddick ................ G04G 21/04
701/491
2012/0275686 A1 11/2012 Wilson et al.
2012/0293544 A1 11/2012 Miyamoto et al.
2013/0044128 A1 * 2/2013 Liu ...................... G02B 27/017
345/633
2013/0063345 A1 3/2013 Maeda
2013/0073978 A1 3/2013 Butler et al.
2013/0125066 A1 5/2013 Klein et al.
2013/0141428 A1 6/2013 Gipson
2013/0147793 A1 6/2013 Jeon et al.
2013/0178257 A1 7/2013 Langseth
2013/0179761 A1 7/2013 Cho et al.
2013/0265220 A1 10/2013 Fleischmann et al.
2014/0019609 A1 * 1/2014 Williams ................ H04L 43/18
709/224
2014/0037218 A1 * 2/2014 Zweig ..................... G06F 16/51
382/218
2014/0125598 A1 5/2014 Cheng et al.
2014/0200084 A1 7/2014 Butler et al.
2014/0236996 A1 8/2014 Masuko et al.
2014/0316990 A1 * 10/2014 Winston ................ G06F 9/4411
705/44
2015/0035746 A1 2/2015 Cockburn et al.
2015/0054742 A1 2/2015 Imoto et al.
2015/0062160 A1 3/2015 Sakamoto et al.
2015/0153833 A1 6/2015 Pinault et al.
2015/0160736 A1 6/2015 Fujiwara
2015/0169076 A1 6/2015 Cohen et al.
2015/0179147 A1 * 6/2015 Rezaiifar ................ G06F 3/011
345/625

(56) References Cited

U.S. PATENT DOCUMENTS

2015/0181679 A1 6/2015 Liao et al.
2015/0206321 A1 7/2015 Scavezze et al.
2015/0220150 A1 8/2015 Plagemann et al.
2015/0261659 A1 9/2015 Bader et al.
2015/0293666 A1 10/2015 Lee et al.
2015/0371441 A1 12/2015 Shim
2016/0044298 A1 2/2016 Holz et al.
2016/0062618 A1 3/2016 Fagan et al.
2016/0110052 A1 4/2016 Kim et al.
2016/0147308 A1 5/2016 Gelman et al.
2016/0378291 A1 12/2016 Pokrzywka
2017/0003750 A1* 1/2017 Li .......................... G06F 3/017
2017/0031503 A1 2/2017 Rosenberg et al.
2017/0039770 A1 2/2017 Lanier et al.
2017/0060230 A1 3/2017 Faaborg et al.
2017/0109936 A1 4/2017 Powderly et al.
2017/0139478 A1 5/2017 Jeon et al.
2017/0192513 A1 7/2017 Karmon et al.
2017/0236196 A1 8/2017 Isaacson et al.
2017/0236320 A1 8/2017 Gribetz et al.
2017/0237789 A1 8/2017 Harner et al.
2017/0262063 A1 9/2017 Blénessy et al.
2017/0278304 A1 9/2017 Hildreth et al.
2017/0287225 A1 10/2017 Powderly et al.
2017/0296363 A1 10/2017 Yetkin et al.
2017/0308608 A1 10/2017 Freeman
2017/0316606 A1 11/2017 Khalid et al.
2017/0336951 A1 11/2017 Palmaro
2017/0364198 A1 12/2017 Yoganandan et al.
2018/0024623 A1 1/2018 Faaborg et al.
2018/0040044 A1 2/2018 Mattingly et al.
2018/0053351 A1 2/2018 Anderson
2018/0059901 A1 3/2018 Gullicksen
2018/0059902 A1* 3/2018 Martin .................. G06V 20/20
2018/0098059 A1 4/2018 Valdivia et al.
2018/0107278 A1 4/2018 Goel et al.
2018/0113599 A1 4/2018 Yin
2018/0143757 A1* 5/2018 Champion .......... G06F 3/04845
2018/0144556 A1 5/2018 Champion et al.
2018/0207522 A1 7/2018 Roman et al.
2018/0307303 A1 10/2018 Powderly et al.
2018/0322674 A1* 11/2018 Du ........................ G06T 19/006
2018/0322701 A1 11/2018 Pahud et al.
2018/0335925 A1 11/2018 Hsiao et al.
2018/0342106 A1 11/2018 Rosado
2018/0349690 A1 12/2018 Rhee et al.
2018/0361258 A1* 12/2018 Malyuk ................. A63F 13/847
2019/0005716 A1* 1/2019 Singh ...................... G06T 15/80
2019/0026936 A1 1/2019 Gorur Sheshagiri et al.
2019/0035152 A1* 1/2019 Kazansky ............... H04L 67/12
2019/0065027 A1 2/2019 Hauenstein et al.
2019/0088030 A1 3/2019 Masterson et al.
2019/0094981 A1 3/2019 Bradski et al.
2019/0107894 A1 4/2019 Hebbalaguppe et al.
2019/0121522 A1 4/2019 Davis et al.
2019/0139321 A1* 5/2019 Kocharlakota ......... G06F 3/011
2019/0197780 A1* 6/2019 Rao ......................... H04W 8/24
2019/0213792 A1* 7/2019 Jakubzak ................ G06F 3/017
2019/0258318 A1 8/2019 Qin et al.
2019/0278376 A1 9/2019 Kutliroff et al.
2019/0279424 A1 9/2019 Clausen et al.
2019/0286231 A1 9/2019 Burns et al.
2019/0287307 A1* 9/2019 Rogers .................... G06T 15/08
2019/0295101 A1* 9/2019 Porter ................. G06F 16/2365
2019/0302895 A1* 10/2019 Jiang ....................... G06F 3/016
2019/0304166 A1* 10/2019 Yu ........................... G06T 15/20
2019/0306137 A1 10/2019 Isaacson et al.
2019/0310757 A1* 10/2019 Lee ........................ H04N 7/157
2019/0340818 A1 11/2019 Furtwangler
2019/0340876 A1 11/2019 Northrup et al.
2019/0347762 A1* 11/2019 Hwang .............. G06Q 30/0276
2019/0362562 A1 11/2019 Benson
2019/0377416 A1 12/2019 Alexander
2019/0377487 A1 12/2019 Bailey et al.
2019/0385372 A1 12/2019 Cartwright et al.
2020/0020165 A1 1/2020 Tran et al.
2020/0050289 A1 2/2020 Hardie-Bick et al.
2020/0051527 A1 2/2020 Ngo
2020/0089390 A1* 3/2020 Bakhash ............. G06F 3/04817
2020/0097077 A1 3/2020 Nguyen et al.
2020/0097091 A1 3/2020 Chou et al.
2020/0111260 A1 4/2020 Osborn et al.
2020/0151965 A1* 5/2020 Forbes .................. G06T 19/006
2020/0193649 A1* 6/2020 Moon ................... G06F 3/0482
2020/0218342 A1 7/2020 Murali et al.
2020/0225736 A1 7/2020 Schwarz et al.
2020/0225758 A1 7/2020 Tang et al.
2020/0226814 A1 7/2020 Tang et al.
2020/0241730 A1 7/2020 Diverdi et al.
2020/0245017 A1 7/2020 Ganschow et al.
2020/0258278 A1 8/2020 Mirhosseini et al.
2020/0279044 A1* 9/2020 Lum ......................... G06F 8/65
2020/0293178 A1* 9/2020 Kumar ..................... H04L 67/02
2020/0294097 A1* 9/2020 Spivack .............. G06F 3/04883
2020/0320794 A1* 10/2020 Huang .................... G06F 3/147
2020/0401687 A1* 12/2020 Mak ...................... G06F 3/0482
2021/0005022 A1 1/2021 Oser et al.
2021/0011556 A1 1/2021 Atlas et al.
2021/0089639 A1 3/2021 Remillet et al.
2021/0090333 A1 3/2021 Ravasz et al.
2021/0103447 A1* 4/2021 Wei ....................... G06F 3/0481
2021/0124475 A1* 4/2021 Inch ........................ G06F 3/011
2021/0168324 A1 6/2021 Ngo
2021/0201029 A1 7/2021 Ju et al.
2021/0252392 A1* 8/2021 Stevens ................... G06F 3/016
2021/0271370 A1 9/2021 Williams et al.
2021/0343182 A1 11/2021 Lu
2021/0375065 A1* 12/2021 Cannefax .............. G06V 20/20
2021/0398095 A1 12/2021 Mallett et al.
2022/0036447 A1* 2/2022 Spivack ................. G06Q 40/04
2022/0148268 A1 5/2022 Yilanci et al.
2022/0207830 A1* 6/2022 Allen ..................... G09B 19/00
2022/0254114 A1* 8/2022 Frederick .............. H04L 67/131
2022/0292543 A1* 9/2022 Henderson ......... G06Q 30/0252
2022/0308716 A1* 9/2022 Rice ...................... G06F 3/0484
2022/0387873 A1* 12/2022 Hall ................... A63B 24/0021
2022/0414487 A1* 12/2022 Si ........................... G06N 20/00
2023/0092103 A1* 3/2023 Puyol ...................... G06F 3/011
715/205
2023/0120052 A1 4/2023 Wallen et al.
2023/0152936 A1 5/2023 Inch et al.
2023/0171438 A1 6/2023 Liu et al.
2023/0245350 A1* 8/2023 Webber ................... G06F 3/012
345/633
2023/0325896 A1 10/2023 Luker
2023/0410449 A1 12/2023 Shirai
2023/0419617 A1 12/2023 Krenn et al.
2023/0419618 A1 12/2023 Krenn et al.
2024/0061545 A1 2/2024 Gu et al.
2024/0070215 A1 2/2024 Inch et al.
2024/0073489 A1 2/2024 Hopmann
2024/0112409 A1 4/2024 Cross et al.
2024/0160337 A1 5/2024 Edelblut et al.
2025/0037383 A1 1/2025 Cross et al.
2025/0284756 A1 9/2025 Inch et al.

FOREIGN PATENT DOCUMENTS

CN 108139803 A 6/2018
CN 109564749 A 4/2019
CN 110442229 A 11/2019
CN 112219205 A 1/2021
EP 3719616 A1 10/2020
JP 2001325616 A 11/2001
JP 2009140294 A 6/2009
JP 2014071498 A 4/2014
JP 2018109835 A 7/2018
KR 20170126362 A 11/2017
WO 2018016464 A1 1/2018
WO 2019236568 A1 12/2019
WO 2022006661 A1 1/2022
WO 2022170222 A1 8/2022

(56) References Cited

FOREIGN PATENT DOCUMENTS

OTHER PUBLICATIONS

Office Action mailed Apr. 11, 2025 for Korean Application No. 10-2022-7017084, filed Sep. 27, 2020, 6 pages.
Office Action mailed Dec. 8, 2025 for Korean Application No. 10-2023-7027153, filed Feb. 11, 2022, 7 pages.
Office Action mailed Jul. 15, 2025 for European Patent Application No. 20789416.3, filed on Sep. 27, 2020, 4 pages.
Office Action mailed Sep. 16, 2025 for Japanese Patent Application No. 2023-543355, filed on Feb. 11, 2022, 5 pages.
Office Action mailed May 15, 2026 for Chinese Application No. 202280014443.9, filed Aug. 10, 2023, 10 pages.
Chen Y., et al., "Object Modeling by Registration of Multiple Range Images," Proceedings of the 1991 IEEE International Conference on Robotics and Automation, Apr. 1991, pp. 2724-2729, Retrieved from the internet: URL: https://graphics.stanford.edu/courses/cs348a-17-wi nter/Handouts/chen-medioni-align-rob91.pdf.
David H., "Oculus Developer Hub can now Launch WebXR URLs on Your Quest," uploadvr.com, Dec. 4, 2021, 2 pages, Retrieved from the Internet: https://web.archive.org/web/20211204181804/https://www.uploadvr.com/oculus- developer-hu b-we b- u rl s- m etri cs/.
Foxman M., et al., "United We Stand: Platforms, Tools and Innovation with the Unity Game Engine," Social Media Society, Nov. 21, 2019, 10 pages.
Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.
International Preliminary Report on Patentability for International Application No. PCT/US2020/052976, mailed May 5, 2022, 9 pages.
International Preliminary Report on Patentability for International Application No. PCT/US2023/025680, mailed Jan. 2, 2025, 10 pages.
International Preliminary Report on Patentability for International Application No. PCT/US2023/025685, mailed Jan. 2, 2025, 7 pages.
International Preliminary Report on Patentability for International Application No. PCT/US2023/030469, mailed Feb. 27, 2025, 10 pages.
International Search Report and Written Opinion for International Application No. PCT/US2020/052976, mailed Dec. 11, 2020, 10 Pages.
International Search Report and Written Opinion for International Application No. PCT/US2021/064674, mailed Apr. 19, 2022, 13 pages.
International Search Report and Written Opinion for International Application No. PCT/US2022/016110, mailed Apr. 29, 2022, 12 pages.
International Search Report and Written Opinion for International Application No. PCT/US2023/017413, mailed Jul. 4, 2023, 12 pages.
International Search Report and Written Opinion for International Application No. PCT/US2023/018759, mailed Jun. 14, 2023, 9 pages.
International Search Report and Written Opinion for International Application No. PCT/US2023/025680, mailed Sep. 8, 2023, 11 pages.
International Search Report and Written Opinion for International Application No. PCT/US2023/025685, mailed Oct. 5, 2023, 9 pages.
International Search Report and Written Opinion for International Application No. PCT/US2023/030469, mailed Nov. 20, 2023, 12 pages.
International Search Report and Written Opinion for International Application No. PCT/US2023/032524, mailed Nov. 16, 2023, 9 pages.
Katz N., et al., "Extending Web Browsers with a Unity 3D-Based Virtual Worlds Viewer," IEEE Computer Society, Sep./Oct. 2011, vol. 15 (5), pp. 15-21.
Mayer S., et al, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Milborrow S., "Active Shape Models with Stasm," [Retrieved on Sep. 20, 2022], 3 pages, Retrieved from the internet: URL http://www.milbo.users.sonic.net/stasm/.
Milborrow S., et al., "Active Shape Models with SIFT Descriptors and Mars," Department of Electrical Engineering, 2014, 8 pages, Retrieved from the internet: URL: http://www.milbo.org/stasm-files/active-shape-models-with-sift-and-mars.pdf.
MRPT: "RANSAC C++ Examples," 2014, 6 pages, Retrieved from the internet: URL: https://www.mrpt.org/tutorials/programming/maths-and-geometry/ransac-c-examples/.
Oculus VR., "Oculus Developer Hub Update 1.8," Oculus, 5 pages, Jun. 22, 2021, Retrieved from the Internet: https://web.archive.Org/web/20210622003501/https://developer.oculus.com/blog/oculus-developer-hub-update-18/.
Office Action mailed Jan. 7, 2025 for Japanese Patent Application No. 2022-500566, filed on Sep. 27, 2020, 3 pages.
Office Action mailed Nov. 8, 2023 for European Patent Application No. 20789416.3, filed on Sep. 27, 2020, 4 pages.
Office Action mailed Mar. 14, 2024 for Chinese Application No. 202080057590.5, filed Sep. 27, 2020, 9 pages.
Office Action mailed Jul. 30, 2024 for Japanese Patent Application No. 2022-500566, filed on Sep. 27, 2020, 7 pages.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Orland K., "So What is the "Metaverse," Exactly?," ars Technica, Dec. 7, 2021 [Retrieved on Jun. 16, 2023], pp. 1-14, Retrieved from the Internet: https://web.archive.Org/web/20220407114023/https://arstechnica.com/gaming/2021/11/everyone-pitching-the-metaverse-has-a-different-idea-of-what-it-is/.
Qiao X., et al., "Web AR: A Promising Future for Mobile Augmented Reality—State of the Art. Challenges, and Insights," Proceedings of the IEEE, Apr. 2019, vol. 107 (4), pp. 651-666.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et al., "EyePointing: A Gaze-Based Selection Technique," Proceedings of Mensch and Computer, Hamburg, Germany, Sep. 8-11, 2019, pp. 719-723.
Srinivasa R.R., "Augmented Reality Adaptive Web Content," 13th IEEE Annual Consumer Communications Networking Conference (CCNC), 2016, pp. 1-4.
Trademark U.S. Appl. No. 73/289,805, filed Dec. 15, 1980,1 page.
Trademark U.S. Appl. No. 73/560,027, filed Sep. 25, 1985,1 page.
Trademark U.S. Appl. No. 74/155,000, filed Apr. 8, 1991,1 page.
Trademark U.S. Appl. No. 76/036,844, filed Apr. 28, 2000, 1 page.
Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.
Webxr: "WebXR Device API Explained," Aug. 23, 2021, 31 pages, Retrieved from the Internet URL: https://web.archive. Org/web/20210823211837/https://immersive-web.github.io/webxr/explainer.html#objectdata-visualization.
Whitton M., et al., "Integrating Real and Virtual Objects in Virtual Environments," Aug. 24, 2007, Retrieved from http://web.archive.org/web/20070824035829/ http://www.cs.unc.edu/~whitton/ExtendedCV/Papers/2005-HCII-Whitton-MixedEnvs.pdf, on May 3, 2017, 10 pages.
Wikipedia: "Canny Edge Detector," [Retrieved on Sep. 20, 2022], 10 pages, Retrieved from the internet: URL: https://en.wi ki pedia.org/wi ki/Canny_edge_detector.

(56) References Cited

OTHER PUBLICATIONS

Wikipedia: "Iterative Closest Point," [Retrieved on Sep. 20, 2022], 3 pages, Retrieved from the internet: URL: https://en.wikipedia.org/wiki/Iterative_closest_point.

YouTube: "V1 VR NFT Art Gallery is Live! OnCyber.xyz/ArtisMyWeapon," Art is My Weapon, Jan. 19, 2022, 2 pages, Retrieved from the Internet URL: https://www.youtube.com/watch?v=BMfLjrkpGb0.

* cited by examiner

GROUP TRAVEL BETWEEN ARTIFICIAL REALITY DESTINATIONS

CROSS-REFERENCE TO RELATED APPLICATIONS

This application is a continuation of U.S. application Ser. No. 18/045,203, filed Oct. 10, 2022, titled "Group Travel Between Artificial Reality Destinations," currently pending, which is herein incorporated by reference in its entirety.

TECHNICAL FIELD

The present disclosure is directed to facilitating group travel between artificial reality (XR) destinations.

BACKGROUND

Users interacting with artificial reality (XR) devices can view content in an artificial reality environment that includes real-world objects and/or two-dimensional (2D) and/or three-dimensional (3D) virtual objects. For example, the artificial reality environment can be a virtual environment depicted by a virtual reality (VR) device showing a set of virtual objects. As another example, the artificial reality environment can be a mixed reality environment with real-world objects and virtual objects supplemented over the real-world objects. A user can view the objects in the artificial reality environment and modify content in the artificial reality environment.

Some 3D interactions can occur within a "metaverse," which is a superset of XR destinations (e.g., XR universes, XR worlds, etc.) to which users, represented by avatars, can virtually travel and interact with the virtual environment, virtual objects, and other users. The metaverse can include multiple XR universes (e.g., applications, environments, or platforms) that, in some cases, are hosted by multiple different organizations. Within an XR universe are XR worlds (i.e., virtual spaces within an XR universe) in which a user can build and maintain virtual property viewable and/or accessible by other users. In some cases, XR destinations within the metaverse can be hosted by different entities. Thus, to travel between XR destinations, a user may have to switch between applications that are specific to those XR destinations.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
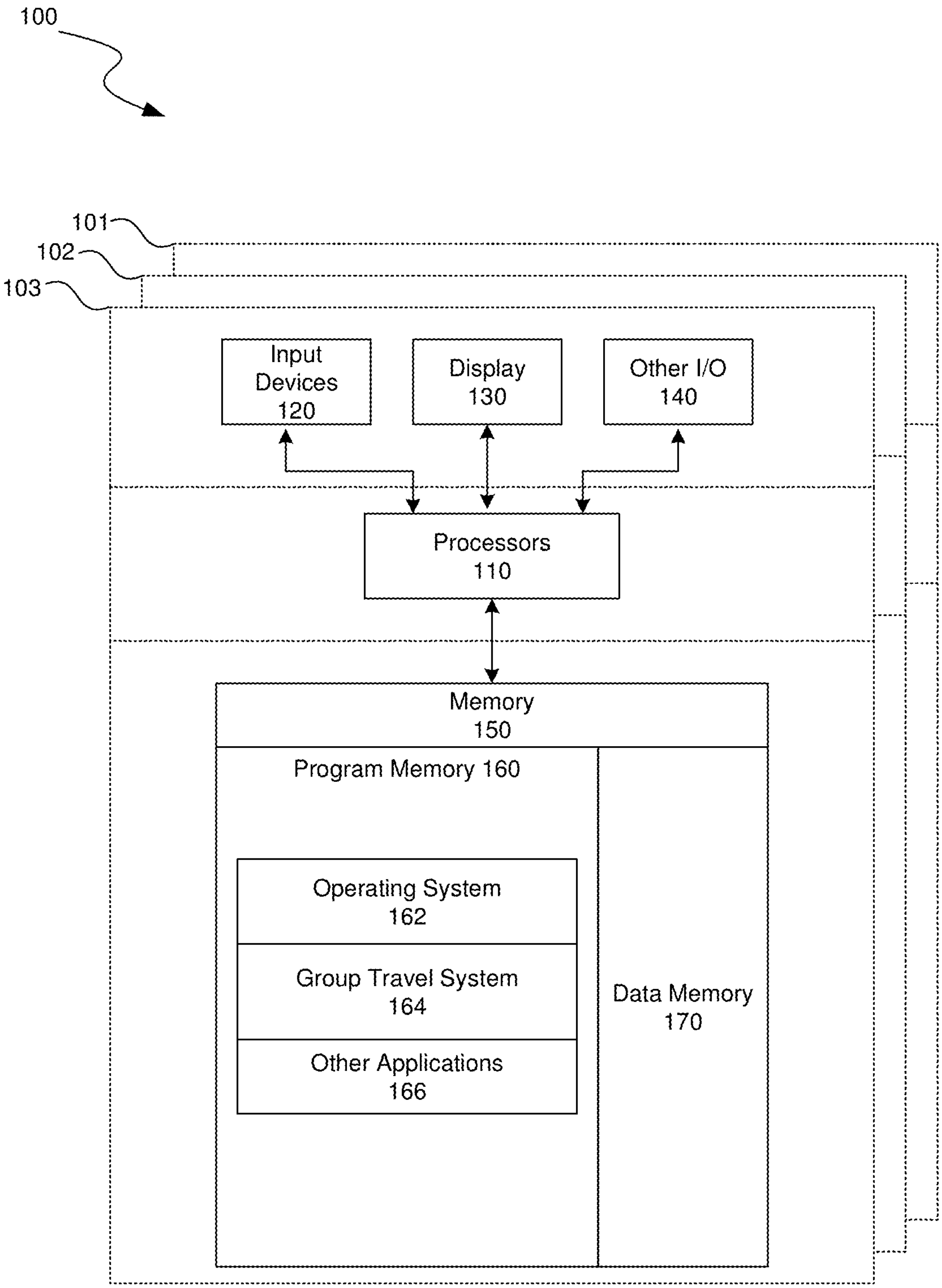
FIG. 1 is a block diagram illustrating an overview of devices on which some implementations of the present technology can operate.

Aspects of the present disclosure are directed to facilitating group travel between artificial reality (XR) destinations, including switching between hosting applications. Currently, users in an artificial reality (XR) experience cannot travel with a group to a specific destination or between destinations. Thus, the technology provides a hosting computing system with a solution to create portals to travel between worlds, levels, or applications without the need for substantial intervention on the platform level. For example, users within a group in an XR experience can be assigned a same session identifier, which can represent the multiplayer session that the users are inside. When the users select a destination, some implementations can provide the destination's hosting computing system with the session identifier associated with the users (as well as other metadata), such that the hosting computing system can ensure that the users travel to the same instance of the destination together. If one of the users does not already have the application needed to visit the destination installed, some implementations can display an overlay page in XR that allows the user to acquire access rights to the destination, then travel to the same instance of the destination as the other users.

For example, multiple users using XR head-mounted displays (HMDs) can be in a same virtual lobby (i.e., an XR experience). Some of the users can be in a group in the virtual lobby (e.g., a previously formed party, or a party formed within the virtual lobby). Each of the users in the group can be assigned a same session identifier. The HMDs can display a virtual doorway associated with a virtual puzzle game. When one or more of the users in the group walk through the virtual doorway, some implementations can initiate virtual group travel by the one or more users (and, in some cases, any other users also in the group) to a same instance of the virtual puzzle game based on the assigned session identifier. If one of the users does not have virtual puzzle game downloaded, that user's HMD can display an overlay page allowing the user to acquire rights to, download and install the virtual puzzle game. That user can then join the group in the same instance of the virtual puzzle game. Thus, the users from the group within the virtual lobby can stay together and play the virtual puzzle game together.

In another example, multiple users without a preexisting or established relationship (e.g., not in a previously formed party) using XR HMDs can be in a same virtual bowling game. The HMDs can display a virtual tunnel to a virtual golf game. When two or more of the users walk through the virtual tunnel (e.g., within a threshold time of one another), some implementations can assign those users a same session identifier, and can initiate virtual group travel by those users to a same instance of the virtual golf game based on the assigned session identifier. Similar to the example above, if one of the users does not have the virtual golf game installed, that user's HMD can display an overlay page allowing the user to acquire rights to download and install the virtual golf game. That user can then join the group in the same instance of the virtual golf game. Thus, the users from the same virtual bowling game that initiate virtual group travel to the virtual golf game (e.g., via the virtual tunnel) can stay together and play the virtual golf game together.

A "metaverse" describes a superset of all virtual spaces, XR worlds, XR experiences, and/or XR universes where users (e.g., represented by avatars) can interact with virtual environments, virtual objects, and each other. The metaverse can include virtual universes, each hosted by one organization or multiple different organizations, and can be the top level of a virtual space conceptual hierarchy. Although it is contemplated that one host server can host multiple XR universes, it is also contemplated that multiple host servers can host a single XR universe.

An "XR universe" or "universe" generally refers to an XR application, environment, or platform made up of one or more virtual worlds within which multiple users can explore, meet, and interact with other users, objects, and artifacts backed up by the same application service. Often, an XR universe can define a set of primitives and/or rules that define user identity and ownership of virtual assets, XR world physics, and other mechanics. Some XR universes can retrieve digital assets, such as virtual buildings, artwork (e.g., images, videos, non-fungible tokens (NFTs), etc.), web content. In addition, XR universes can interface with centralized and/or decentralized systems to implement an economy. Users can be represented within an XR universe by an avatar, which allows them to interact with other users and provides a player character that navigates through an XR universe. An XR universe can be accessed via two-dimensional (2D) interfaces (e.g., web browsers on a computer, applications on a mobile device, etc.) and/or XR interfaces (e.g., head mounted XR displays), depending on the particular application.

One or more XR worlds can be created and operated within an XR universe, with each XR world being managed by one or more users and/or entities ("owner(s)"). An "XR world" or "world" generally refers to a virtual space within an XR universe in which a user, group of users, and/or entity ("owner") can build and maintain on virtual land, which may be accessible by other users visiting that XR world.

In some implementations, a user can traverse between XR worlds within the same XR universe or between universes without leaving a particular XR application or web application. In other cases, visiting different metaverse universes, worlds, or experiences require different applications. In some cases, an XR experience can have interfaces with XR input devices (e.g., headset, controller, etc.), and in some instances can allow multiple users to participate simultaneously. As a specific example, an XR experience may be a music-based game where users access a first application to hit targets in a manner that synchronizes with the music, another XR experience may be a virtual realty word run through a second application allowing users to socialize and explore together, while a third XR experience may be a mixed reality overlay on a real-world space providing shared collaboration tools. Thus, accessing some XR experiences may involve launching an application on the user's device specific to that XR experience.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

The implementations described herein provide specific improvements in the field of artificial reality (XR) in that they allow seamless virtual group travel for a set of users from an instance of an XR experience that they are accessing together, to an instance of an XR destination. In other words, implementations can facilitate a set of users traveling together from one multiplayer experience to another. Conventionally, users must manually coordinate to move between applications together. For example, to stay together across different applications, users must form a party in one application (i.e., make a formal association between the users indicating to a computing system hosting that application that they should be kept together), close that application, open another application, and reform their party in the other application, in order to experience the applications together. In addition, some XR experiences always require formation of a party in order for a group of users to guarantee that they will be in the same instance of a multiplayer session together.

Aspects of the present disclosure address these problems and others by facilitating virtual group travel between XR experiences using a session identifier that can allow a hosting computing system to easily identify the users to keep together, without requiring reformation of a party. In some instances, aspects of the present disclosure facilitate virtual group travel between XR experiences without requiring formal formation of a party at all. Implementations can allow users to travel between virtual worlds, levels, or even applications seamlessly, even if such XR destinations are hosted by different computing systems. The implementations described herein are necessarily rooted in computing technology (i.e., XR technology) to overcome a problem specifically arising in the realm of computer networks, e.g., communication and coordination between disparate computing systems hosting different XR destinations (that may be even associated with different developers), without requiring a heavy processing or storage load on a central platform computing system.

In addition, implementations can allow users to acquire access rights to XR experiences not previously installed directly from their XR devices (e.g., their HMDs). Thus, a user not having a particular XR experience installed does not have to remove his HMD, access an application store on a 2D interface (e.g., a mobile phone or computer), acquire access rights to the destination via the 2D interface, then again don his HMD to execute the XR experience. Instead, some implementations can allow a user to simply select an XR destination (e.g., by walking through a portal), and if the XR destination is not previously installed, to acquire access rights to the XR destination on the XR device itself. Thus, the implementations described herein also provide for a seamless and improved user experience in the field of XR technology.

Several implementations are discussed below in more detail in reference to the figures. FIG. 1 is a block diagram illustrating an overview of devices on which some implementations of the disclosed technology can operate. The devices can comprise hardware components of a computing system 100 that can facilitate virtual group travel to an artificial reality (XR) destination. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor (s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, group travel system 164, and other application programs 166. Memory 150 can also include data memory 170 that can include, e.g., XR experience rendering data, session identifier data, destination identifier data, access rights data, access rights acquisition data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
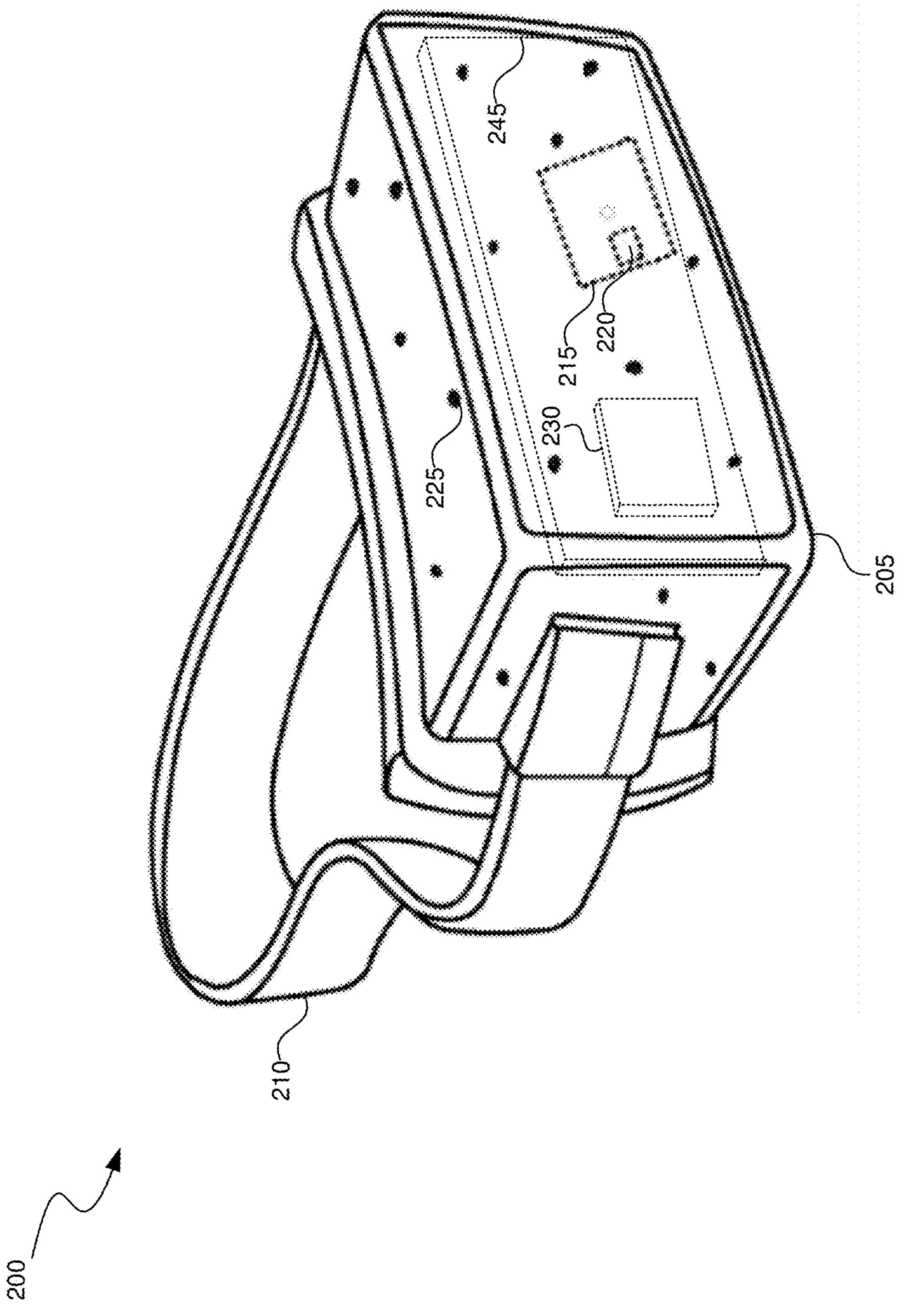
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
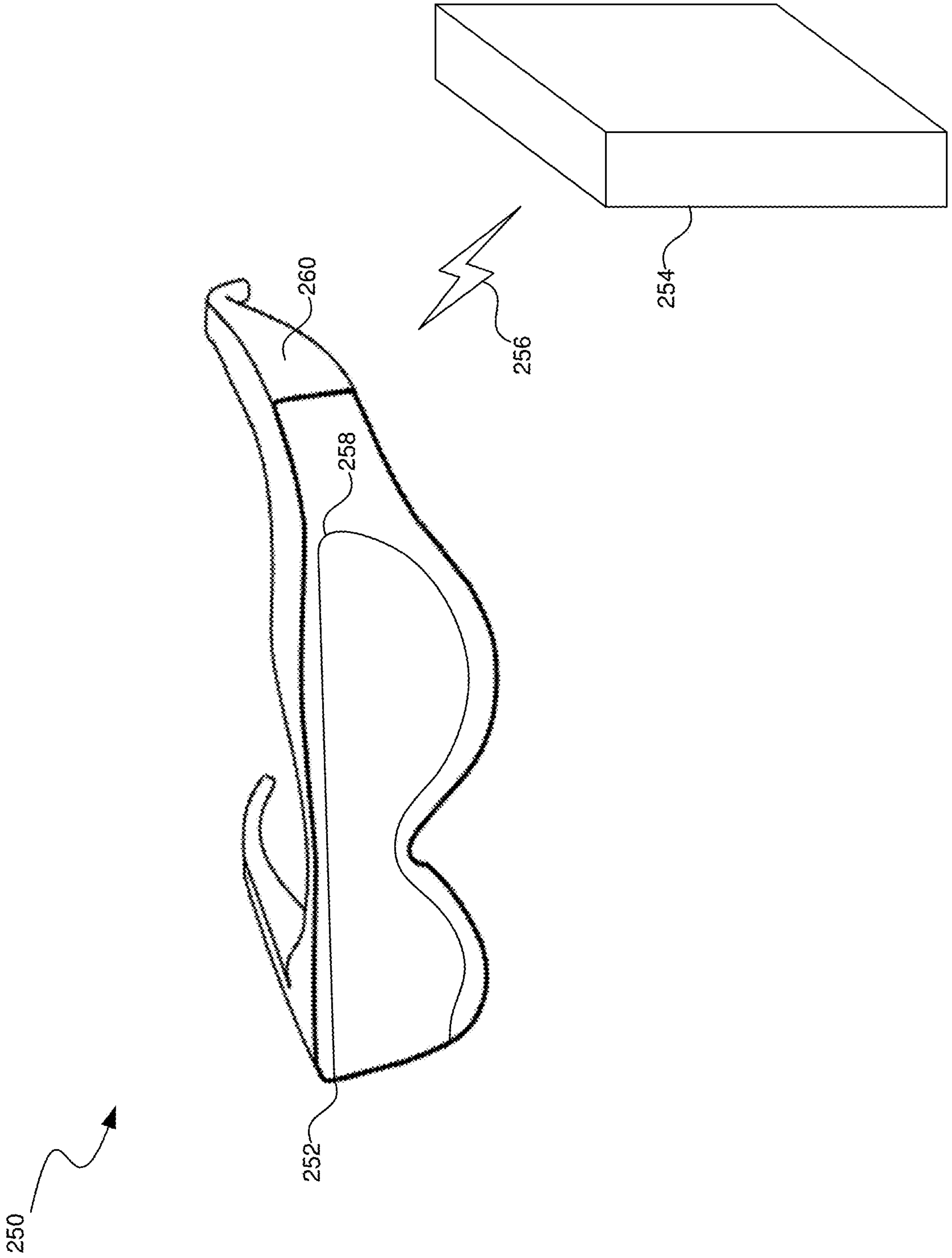
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHZ link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
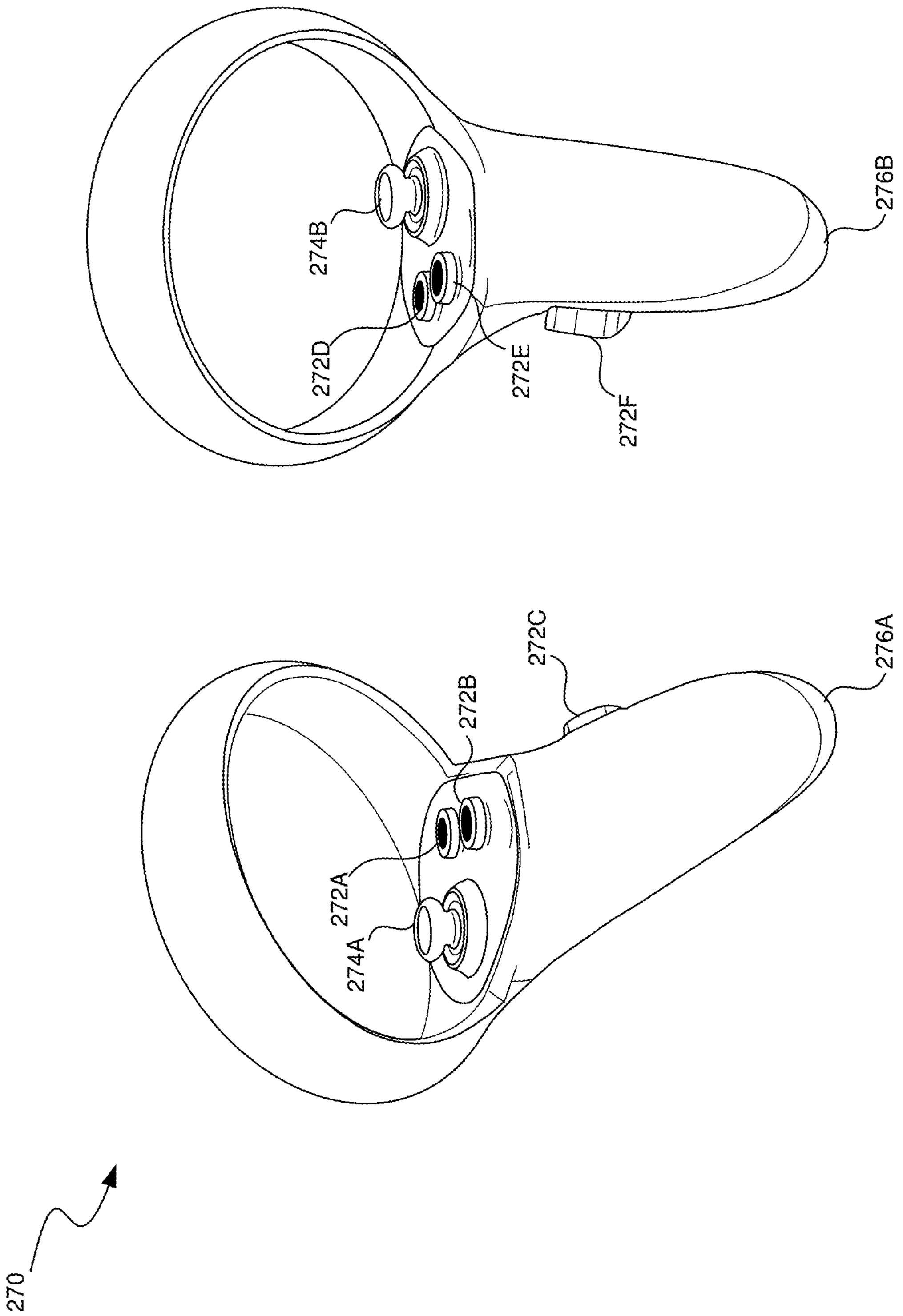
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
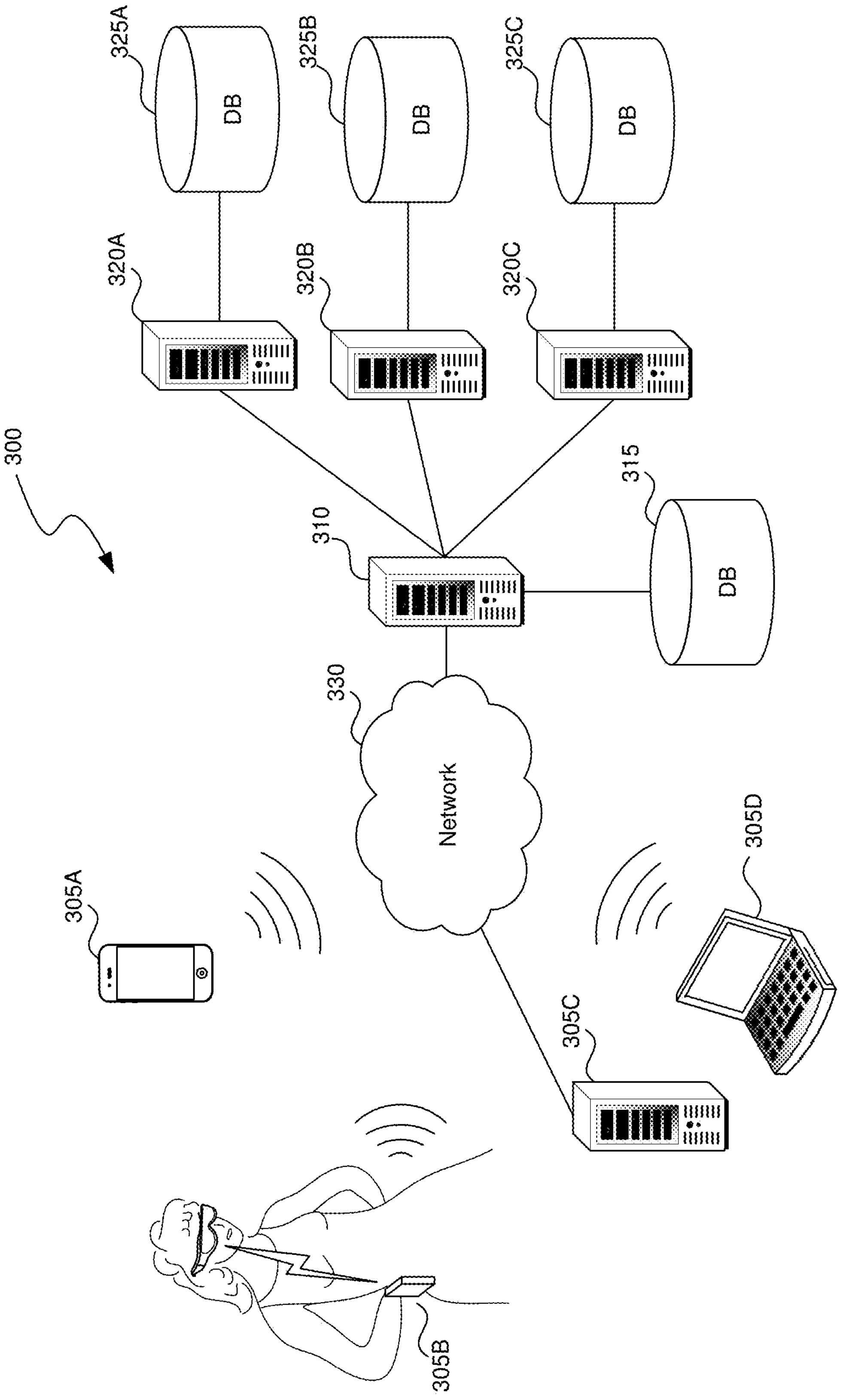
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
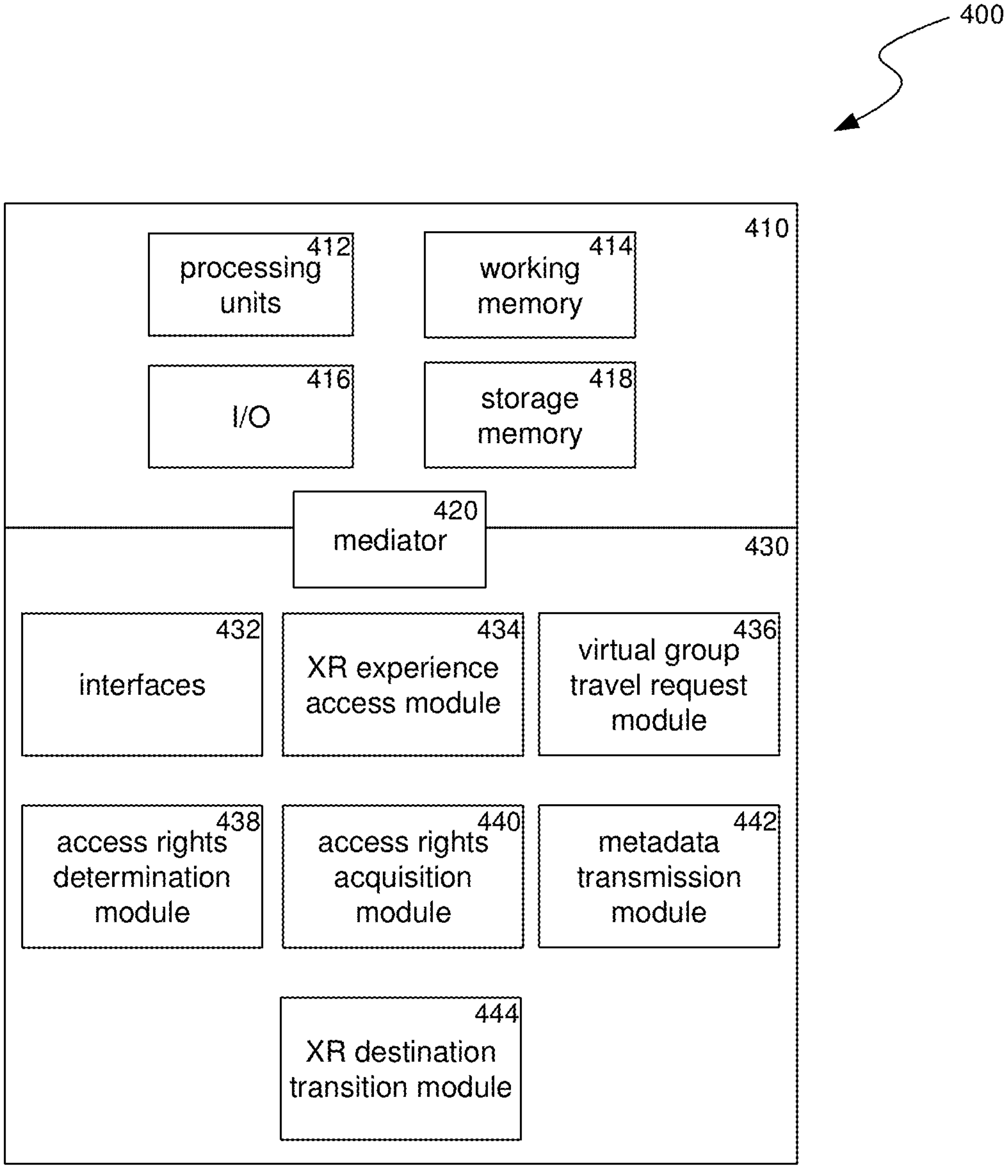
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for facilitating virtual group travel to an artificial reality (XR) destination. Specialized components 430 can include XR experience access module 434, virtual group travel request module 436, access rights determination module 438, access rights acquisition module 440, metadata transmission module 442, XR destination transition module 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

XR experience access module 434 can provide, to an artificial reality (XR) device and one or more other XR devices, access to an instance of an XR experience. In some implementations, XR experience access module 434 can provide access to the instance of the XR experience by providing, for example, rendering data, audio data, haptics data, and/or any other data needed to present the XR experience on the XR devices (i.e., XR experience access module 434 can fully or partially host the XR experience). In some implementations, XR experience access module 434 can provide access to the instance of the XR experience by facilitating communication between the XR devices and another computing system hosting the XR experience, i.e., by acting as an intermediary, without hosting the XR experience.

XR experience access module 434 can assign a session identifier corresponding to a group of XR users. In some implementations, XR experience access module 434 can assign the session identifier based on a group of XR users being explicitly formed, e.g., in a same party, having a mutual friendship, etc. In some implementations, XR experience access module 434 can assign the session identifier based on the group of XR users being implicitly formed, e.g., the XR users transmitting input to initiate virtual group travel to an XR destination from the same instance of the XR experience. For example, XR experience access module 434 can assign a same session identifier to a group of users walking through a portal displayed in the XR experience within a threshold amount of time of the portal's creation and/or display. In some implementations, the session identifier can further represent that the XR device and the one or more other XR devices are within the same instance of the XR experience (e.g., a same session in a multiplayer XR experience in which the XR devices are participating together). Further details regarding providing access to an instance of an XR experience are described herein with respect to block 502 of FIG. 5.

Virtual group travel request module 436 can receive input to initiate virtual group travel to an XR destination. The XR destination can be, for example, an application, a virtual world, a level within an application and/or virtual world, etc., that is outside of or within the XR experience. In some implementations, virtual group travel request module 436 can receive the input from the XR device (e.g., one user walks through a portal associated with the XR destination), at least one of the one or more other XR devices (e.g., one or some of the other users walk through the portal), or all of the XR device and the one or more other XR devices (e.g., all of the users walk through the portal). In some implementations, virtual group travel request module 436 can receive the input over a network (e.g., network 330 of FIG. 3) as a user selection of a selectable element (e.g., a virtual portal) displayed on the XR device(s). Virtual group travel request module 436 can facilitate display of the virtual portal on the XR device(s) by, for example, providing data (e.g., rendering data) needed for the XR device(s) to interpret and display the portal. The portal can be any graphical and/or textual representation of travel to the XR destination, such as a preview of the XR destination, a selectable element describing the XR destination, a virtual doorway, a virtual entrance, a virtual gateway, etc. The XR destination can be associated with a hosting computing system (e.g., one or more computing devices hosting the data needed to execute, render, etc., the XR destination on XR devices). Further details regarding receiving input to initiate virtual group travel to an XR destination are described herein with respect to block 504 of FIG. 5.

Access rights determination module 438 can determine whether the XR device has access rights to the XR destination. In some implementations, access rights determination module 438 can determine whether the XR device has access rights to the XR destination from a flag or other indicator transmitted from the XR device. The XR device can generate the indicator based on a determination of whether the XR destination is included or omitted from a list stored on the XR device of XR applications, worlds, levels, etc., to which the XR device has access. In some implementations, access rights determination module 438 can determine whether the XR device has access rights to the XR destination by querying a lookup table accessible by access rights determination module 438 (e.g., stored in storage memory 418) of XR applications, worlds, levels, etc., to which the XR device has access. Further details regarding determining whether the XR device has access rights to the XR destination are described herein with respect to block 506 of FIG. 5.

In response to a determination by access rights determination module 438 that the XR device does not have access rights to the XR destination, XR destination transition module 444 can pause a transition from the instance of the XR experience to the XR destination. In other words, XR destination transition module 444 can withhold from automatically executing group travel to the XR destination. In some implementations, XR destination transition module 444 can pause the transition to the XR destination for the XR device (and any other of the one or more other XR devices not having access rights to the XR destination). In some implementations, XR destination transition module 444 can pause the transition to the XR destination for all of the XR device and the one or more other XR devices, i.e., can withhold from automatically executing group travel to the XR destination by the entire group. Further details regarding pausing a transition to the XR destination for the XR device are described herein with respect to block 508 of FIG. 5.

Access rights acquisition module 440 can, in response to access rights determination module 438 determining that the XR device does not have access rights to the XR destination, facilitate display of an XR overlay page on the XR device. The XR overlay page can have an option to acquire the access rights to the XR destination. In some implementations, the XR overlay page can be a virtual storefront from which the XR device can purchase the access rights to the XR destination. In some implementations, the XR overlay page can allow the XR device to download the XR destination without requiring purchase. For example, in some implementations, the XR overlay page can display an option to restore access to the XR destination based on a previous purchase or acquisition of access rights to the XR destination, or no purchase may be necessary and terms of use may only need to be agreed to or the XR device need only download the application for the XR destination. Further details regarding facilitating display of an XR overlay page are described herein with respect to block 508 of FIG. 5.

Access rights acquisition module 440 can further receive selection of the option to acquire the access rights to the XR destination from the XR device. In some implementations, the user of the XR device can select the option to acquire the access rights by selection of a virtual or physical button, through an audible selection ("I would like to purchase access to the XR destination"), etc. Access rights acquisition module 440 can then grant the access rights to the XR destination to the XR device. Further details regarding receiving selection of an option to acquire the access rights to the XR destination and granting the access rights to the XR destination are described herein with respect to block 510 of FIG. 5.

Metadata transmission module 442 can transmit metadata to the hosting computing system, including the session identifier. Thus, metadata transmission module 442 can allow the hosting computing system to identify the XR device and the one or more other XR devices having the same session identifier to group them together for virtual travel to the XR destination. The metadata can further include a destination identifier identifying the XR destination from multiple XR destinations (e.g., when the hosting computing system hosts a plurality of XR destinations), device identifiers for the XR devices, etc. Further details regarding transmitting the metadata to a hosting computing system are described herein with respect to block 512 of FIG. 5.

In addition to pausing the transition, XR destination transition module 444 can initiate the transition between the instance of the XR experience and the XR destination for the XR device when the XR device is granted the access rights to the XR destination. In some implementations, XR destination transition module 444 can facilitate a handoff between the computing system hosting the XR experience (e.g., a platform computing system or another hosting computing system) and the hosting computing system for the XR destination. In some implementations, XR destination transition module 444 can initiate the transition by executing (or facilitating execution of) a system call that automatically launches the XR destination and closes the XR experience on the XR device and the one or more other XR devices.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
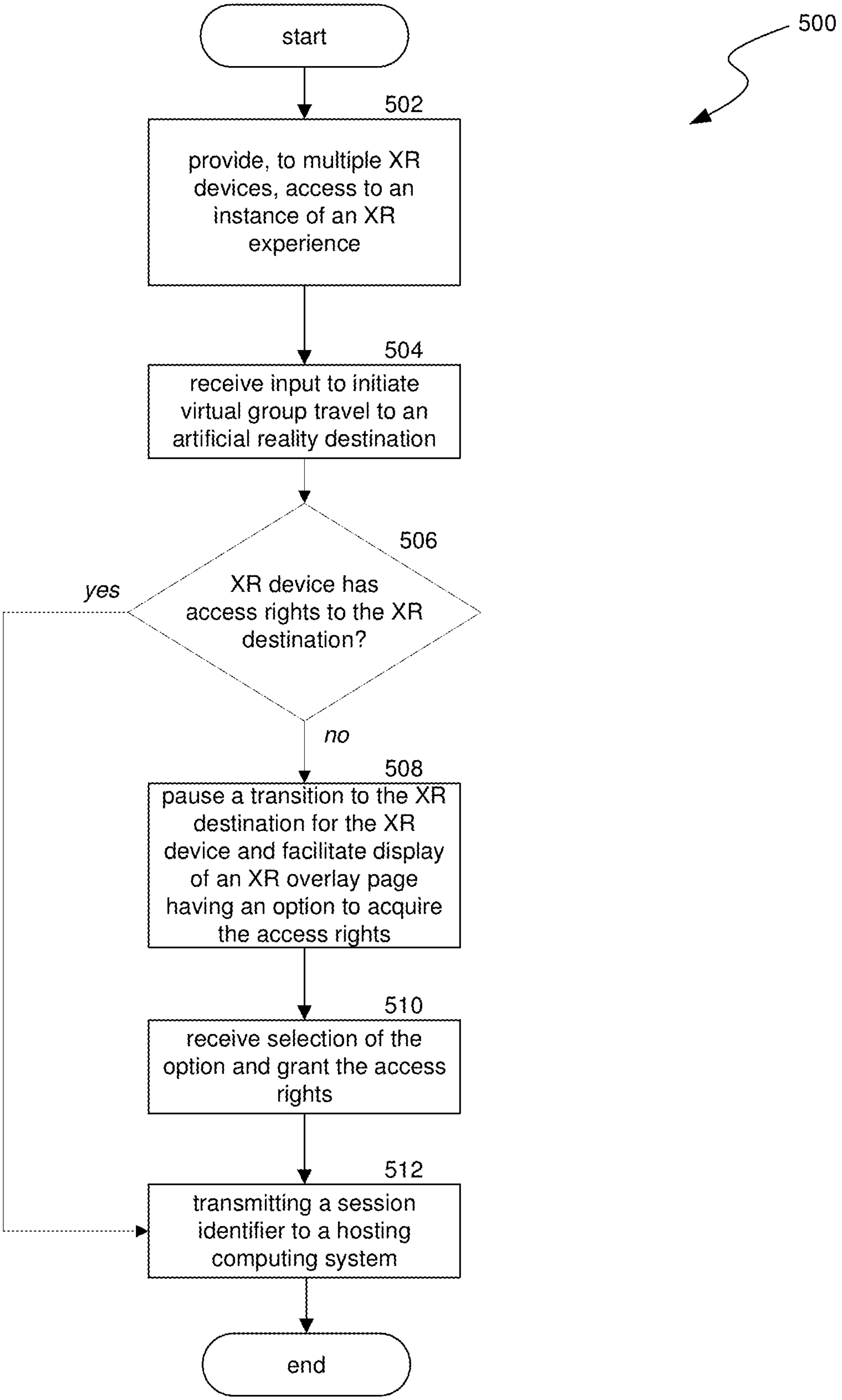
FIG. 5 is a flow diagram illustrating a process used in some implementations of the present technology for facilitating virtual group travel to an artificial reality (XR) destination.

FIG. 5 is a flow diagram illustrating a process 500 used in some implementations for facilitating virtual group travel to an artificial reality (XR) destination. In some implementations, process 500 can be performed as a response to a user request to initiate virtual group travel to an XR destination from within an XR experience. In some implementations, process 500 can be performed by a server or other computing device or system hosting the XR experience, such as a computing device associated with a platform (a "platform computing system"), or a hosting computing system separate from a platform computing system. In some implementations, process 500 can be performed by group travel system 164 of FIG. 1.

At block 502, process 500 can provide, to multiple XR devices, access to an instance of an XR experience. In some implementations, the instance of the XR experience can be a same virtual lobby, a same instance of a virtual world, or any other multiplayer XR experience in which the XR device and the one or more other XR devices are in a same session together. The multiple XR devices can have assigned a session identifier corresponding to a group of XR users (e.g., the users associated with the multiple XR devices). The session identifier can be any string of characters (e.g., letters and numbers) unique to the group of XR users, and can be the same for multiple XR devices within the instance of the XR experience. In some implementations, process 500 can form the group of XR users in response to one or more explicit user requests to associate the users within the group (e.g., a request to form a party). Thus, process 500 can assign a same session identifier to the XR device and the one or more other XR devices based on the formal association of their respective XR users indicating that they should be in the instance of the XR experience together. In some implementations, the group of XR users can be formed prior to receiving input to initiate virtual group travel to the XR destination at block 504.

At block 504, process 500 can receive input to initiate the virtual group travel to the XR destination. The XR destination can be, for example, a virtual world, an application, or a level (e.g. a level within an XR experience, such as a game, virtual world, etc.), to which virtual group travel can be made from the XR experience. In some implementations, process 500 can form the group of XR users while or after the input to initiate the virtual group travel to the XR destination is received. In some implementations, process 500 can form the group of XR users in response to one or more implicit user requests to associate the users within the group. For example, the input can include multiple requests to initiate the virtual group travel to the XR destination from respective XR devices of the multiple XR devices. The group of XR users can be formed based on receiving the multiple requests from the respective XR devices, with the XR users being associated with the respective XR devices. In other words, if process 500 receives input from the multiple XR devices to initiate the virtual group travel, process 500 can form the group based on the XR users associated with the multiple devices. Thus, process 500 can assign a same session identifier to the multiple XR devices based on their input to initiate the virtual group travel to the XR destination from the same instance of the XR experience.

The XR destination can be associated with a hosting computing system, i.e., a server or other computing system hosting the XR destination. In some implementations, the hosting system can be associated with a developer of the XR destination. In some implementations, the hosting computing system can include a single computing device, while in other implementations, the hosting computing system can include multiple computing devices across which some or all of the data needed to host the XR destination is stored on each computing device or across multiple computing devices.

In some implementations, the input to initiate the virtual group travel can be activation of a portal by the XR device. The portal can be, for example, a virtual doorway, a selectable virtual object, a virtual gate, or any other virtual entrance, object, or text indicative of virtual travel to the XR destination. In some implementations, the portal can be rendered and displayed within the instance of the XR experience in response to a request by the XR device and/or one or more of the other XR devices within the instance of the XR experience. In some implementations, the portal can be rendered and displayed to all of the XR devices within the instance of the XR experience. In some implementations, the portal can be rendered and displayed to only some of the XR devices within the instance of the XR experience, e.g., XR devices associated with users who are friends of the requesting XR device, XR devices associated with avatars within a threshold virtual distance of an avatar associated with the requesting XR device, etc., and in some implementations, can only be displayed for a threshold amount of time.

In some implementations, the XR device can activate the portal by receiving a user selection of the portal, such as by the user selecting a physical button on the XR device (or another component of an XR system, such as a controller), by selecting a virtual selectable element displayed on the XR device, by making a particular gesture detected by the XR device, etc. In some implementations, the portal can include a preview of the XR destination. For example, the portal can include a snapshot of the XR destination, a name of the XR destination, a description of the XR destination, who created the portal, etc. In some implementations, the portal can further include a countdown of how long the portal is available, i.e., how long users have to request group travel to the XR destination. At block 506, process 500 can determine whether an XR device of the multiple XR devices has access rights to the XR destination. For example, process 500 can determine whether the XR device does or does not have the XR destination (or portions of the XR destination needed to execute the XR destination) downloaded locally by, for example, querying the XR device for a list of worlds, levels, and/or applications installed on the XR device. In another example, process 500 can query a database located remotely from the XR device (e.g., on a cloud) for a list of XR destinations to which the XR device has access rights. In the latter example, a platform computing device can manage and update the database each time the XR device acquires access rights to an XR destination. If process 500 determines that the XR device does not have access rights to the XR destination at block 506, process 500 can perform block 508 and block 510 prior to performing block 512. If process 500 determines that the XR device has access rights to the XR destination at block 506, process 500 continues to block 512.

At block 508, process 500 can pause a transition from the instance of the XR experience to the XR destination for the XR device, such that the XR device is not automatically directed to the XR destination. In some implementations, process 500 can pause the transition from the instance of the XR experience to the XR destination for all of the multiple XR devices. In some implementations, process 500 can pause the transition from the instance of the XR experience to the XR destination for the XR device and any other XR devices of the multiple XR devices that do not already have access rights to the XR destination. While the transition is paused, process 500 can facilitate display of an XR overlay page on XR device. Process 500 can facilitate display of the XR overlay page by, for example, generating, transmitting, and/or interpreting data needed for the XR device to render and display the overlay page on the XR device, and/or instructing or causing the XR device to render and display the overlay page. The XR overlay page can have an option to acquire the access rights to the XR destination. For example, the XR overlay page can include an option to purchase the access rights to the XR destination.

At block 510, process 500 can receive selection of the option to acquire the access rights to the XR destination from the XR device and grant the access rights to the XR destination to the XR device. For example, a user of the XR device can select the option to acquire the access rights to the XR destination by selecting a physical button on the XR device (or another component of an XR system, such as a controller), by selecting a virtual selectable element displayed on the XR device, by making a particular gesture detected by the XR device, etc. In some implementations, the user of the XR device can provide a payment of money, tokens, and/or credits in order to receive the access rights to the XR destination. Upon process 500 granting the access rights to the XR destination, the XR device can download and/or install the XR destination from the platform computing device, the hosting computer device, or another computing device storing and/or providing access to data needed to execute the XR destination.

At block 512, process 500 can transmit the session identifier to the hosting computing system. Process 500 can transmit the session identifier to the hosting computing system via any suitable method, such as over a wired or wireless network, as described further herein with respect to FIG. 3. In some implementations, process 500 can transmit other metadata to the hosting computing system along with the session identifier. For example, process 500 can transmit device identifiers associated with the XR device and the one or more other XR devices, such that the hosting computing system can identify the XR devices for which to provide group travel to the XR destination. In another example, process 500 can set or identify a destination identifier associated with the XR destination and transmit the destination identifier to the hosting computing system. The destination identifier can specify the virtual world, application, and/or level to which the multiple XR devices wish to travel.

Figure 6:
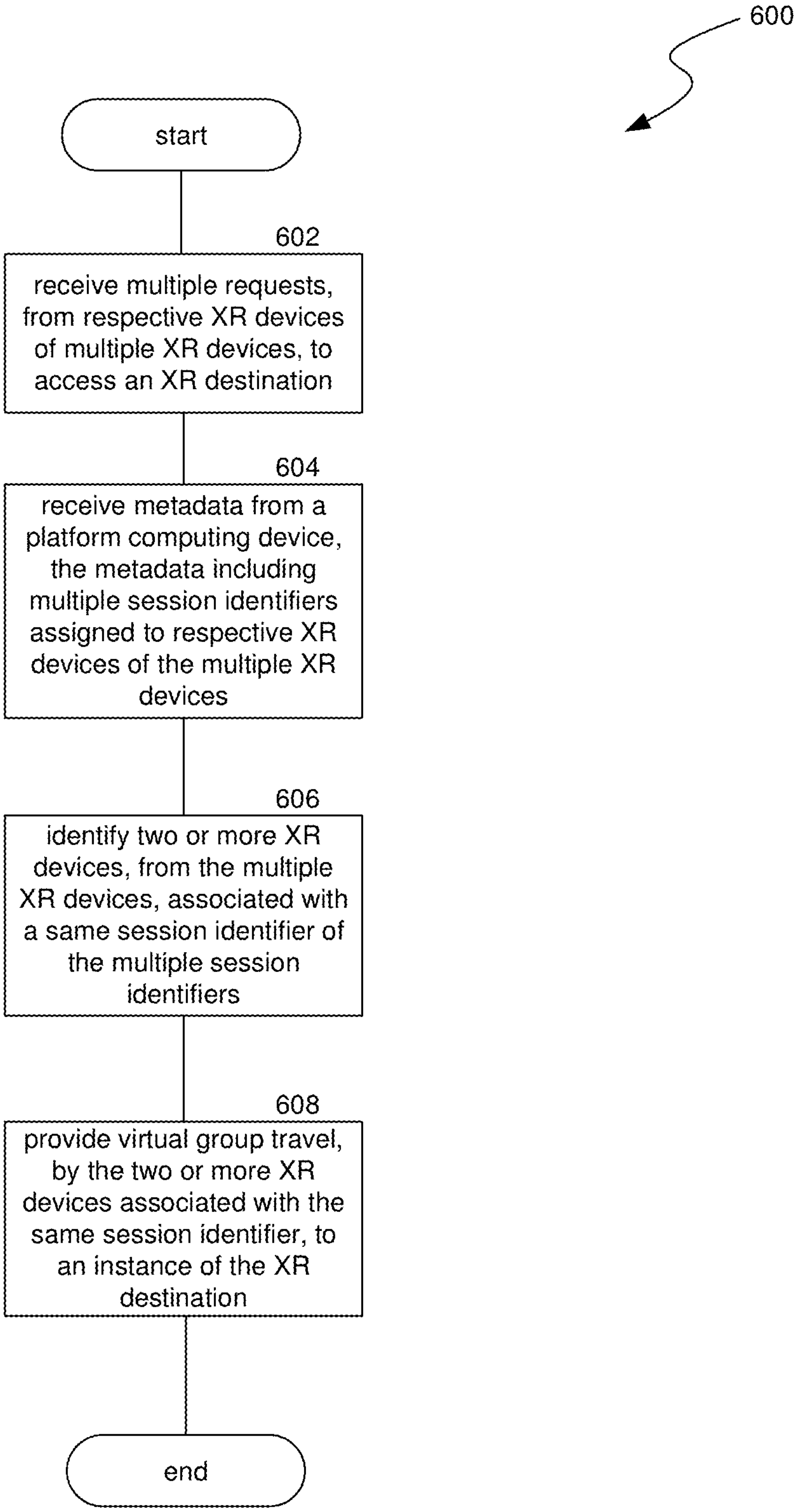
FIG. 6 is a flow diagram illustrating a process used in some implementations of the present technology for providing virtual group travel to an artificial reality (XR) destination.

Upon receipt of the session identifier, the hosting computing system can provide, based on the session identifier, the virtual group travel by the multiple XR devices from the instance of the XR experience to an instance of the XR destination, as described further herein with respect to FIG. 6. In some implementations, the hosting computing system can identify the XR destination to which to provide the virtual group travel from the destination identifier. In some implementations, the XR experience can be provided by a first application associated with a first developer, and the XR destination can be provided by a second application associated with a second developer (i.e., a different developer than that of the first application). In such implementations, the hosting computing system can provide the virtual group travel by causing the XR device and the one or more other XR devices to automatically execute the second application, without further input from one or more of the multiple XR devices. In some implementations, process 500 can receive confirmation from the hosting computing system that the XR device and the one or more other XR devices completed the virtual group travel to the instance of the XR destination, i.e., that the XR device and the one or more other XR devices have access to the same instance of the XR destination. In some implementations, the confirmation can be a return transmission including the device identifiers, the session identifiers, and/or the destination identifier.

In some implementations, process 500 may not receive selection of the option to acquire the access rights to the XR destination and grant the access rights at block 510. In other words, in some implementations, the user of the XR device may choose to not acquire the access rights to the XR destination. In such implementations, for example, process 500 can facilitate virtual group travel to the XR destination for the other XR devices of the multiple XR devices having access rights to the XR destination, and transmit an indicator to the hosting computing system that the XR device does not have access rights. In one example, the hosting computing system can then facilitate display of a "spectator mode" on the XR device not having access rights to the XR destination. In such a spectator mode, the XR device can view the instance of XR destination (e.g., from the viewpoint of one of the other XR devices) without being able to interact with virtual objects (e.g., the virtual environment, avatars of other users, "physical" objects in the XR destination such as virtual cars, trees, etc.) within the instance of the XR destination. In another example, the hosting computing system can allow the XR device to have only limited capabilities and/or abilities within the XR destination (e.g., to access only a limited version of the XR destination). In other words, the limited version can have at least one reduced feature with respect to a full version of the XR destination, the full version of the XR destination only being accessible by the XR devices having access rights to XR destination. For example, the limited version of the instance of the XR destination may allow the XR device not having access rights to only perform certain actions and/or interactions within the instance of the XR destination, to only have limited customizable options (e.g., to change an appearance of an avatar of a user of the XR device, to modify an appearance of the XR environment, etc.).

In still another example, if the XR device does not acquire access rights for the XR destination, process 500 can prompt the XR device and/or at least one of the other XR devices of the multiple XR devices to select an alternate destination to which all of the multiple XR devices have access rights. In other implementations, process 500 can automatically facilitate redirection of the multiple XR devices to an alternate destination to which all of the multiple XR devices have access rights. In some implementations, process 500 can determine an XR destination to which the XR device and the one or more other XR devices have access rights by accessing a lookup table storing a list of XR destinations to which respective XR devices have access rights, and/or by querying the multiple XR devices for a list of XR destinations to which they have access rights, and selecting an XR destination listed in association with all of the multiple XR devices.

FIG. 6 is a flow diagram illustrating a process 600 used in some implementations for providing virtual group travel to an artificial reality (XR) destination. In some implementations, process 600 can be performed as a response to receiving user requests to access an XR destination. In some implementations, process 600 can be performed by one or more servers or other computing devices hosting the XR destination (a "hosting computing system").

At block 602, process 600 can receive multiple requests, from respective XR devices of multiple XR devices, to access an XR destination. In some implementations, process 600 can receive the multiple requests in response to user selections via respective XR devices to initiate group travel to the XR destination, such as by selection of a portal displayed on the XR devices. In some implementations, the XR devices can generate respective requests while within the same or different instances of an XR experience.

At block 604, process 600 can receive metadata from a platform computing device. The metadata can include a plurality of session identifiers assigned to respective XR devices of the multiple XR devices. The session identifiers can correspond to groups of XR users associated with respective XR devices generating requests to access the XR destination. The session identifier can be any string of characters (e.g., letters and numbers) unique to a particular group of users, and can be the same for the all of the users within the group. In some implementations, the metadata can include other data, such as device identifiers corresponding to respective XR devices and/or a destination identifier corresponding to the XR destination.

At block 606, process 600 can identify two or more XR devices, from the multiple XR devices, associated with a same session identifier of the plurality of session identifiers. In some implementations, process 600 can parse the metadata received from the platform computing device to extract and group together the XR devices having the same session identifier corresponding to a group of XR users. For example, XR devices traveling from a particular instance of an XR experience in a group can be assigned a first session identifier, while XR devices traveling from the same or different instance of the XR experience (or an instance of a different XR experience) in a different group can be assigned a second session identifier that is different than the first session identifier. In other words, in some implementations, each session identifier can be unique to a particular group traveling from a same instance of an XR experience. Thus, in the above example, process 600 can group together the XR devices having the first session identifier, and separately group together the XR devices having the second session identifier.

At block 608, process 600 can provide group travel, by the two or more XR devices associated with the same session identifier, to an instance of the XR destination. Process 600 can provide group travel to the instance of the XR destination by, for example, facilitating presentation of the same instance of the XR destination on the two or more XR devices. Process 600 can facilitate presentation to the two or more XR devices by, for example, generating, transmitting, and/or interpreting rendering data, audio data, haptics data, etc., needed to present the XR destination on the two or more XR devices, processing commands received from the two or more XR devices, modifying the XR destination based on the commands, etc.

Thus, process 600 can provide access to the same instance of the XR destination to XR devices having the same session identifier, such that those XR devices can experience the XR destination together. Process 600 can further use a destination identifier to identify the particular XR destination to which to provide the group travel for the two or more XR devices. In implementations in which the metadata includes device identifiers, process 600 can use the device identifiers to identify which XR devices to provide group travel together to the same instance of the XR destination. In some implementations, process 600 can generate and transmit a confirmation to the platform computing system that the XR device and the one or more other XR devices completed the virtual group travel to the instance of the XR destination, i.e., that the XR device and the one or more other XR devices were kept together and are accessing the same instance of the XR destination. In some implementations, the confirmation can be a return transmission including the device identifiers, the session identifiers, and/or the destination identifier.

Figure 7A:
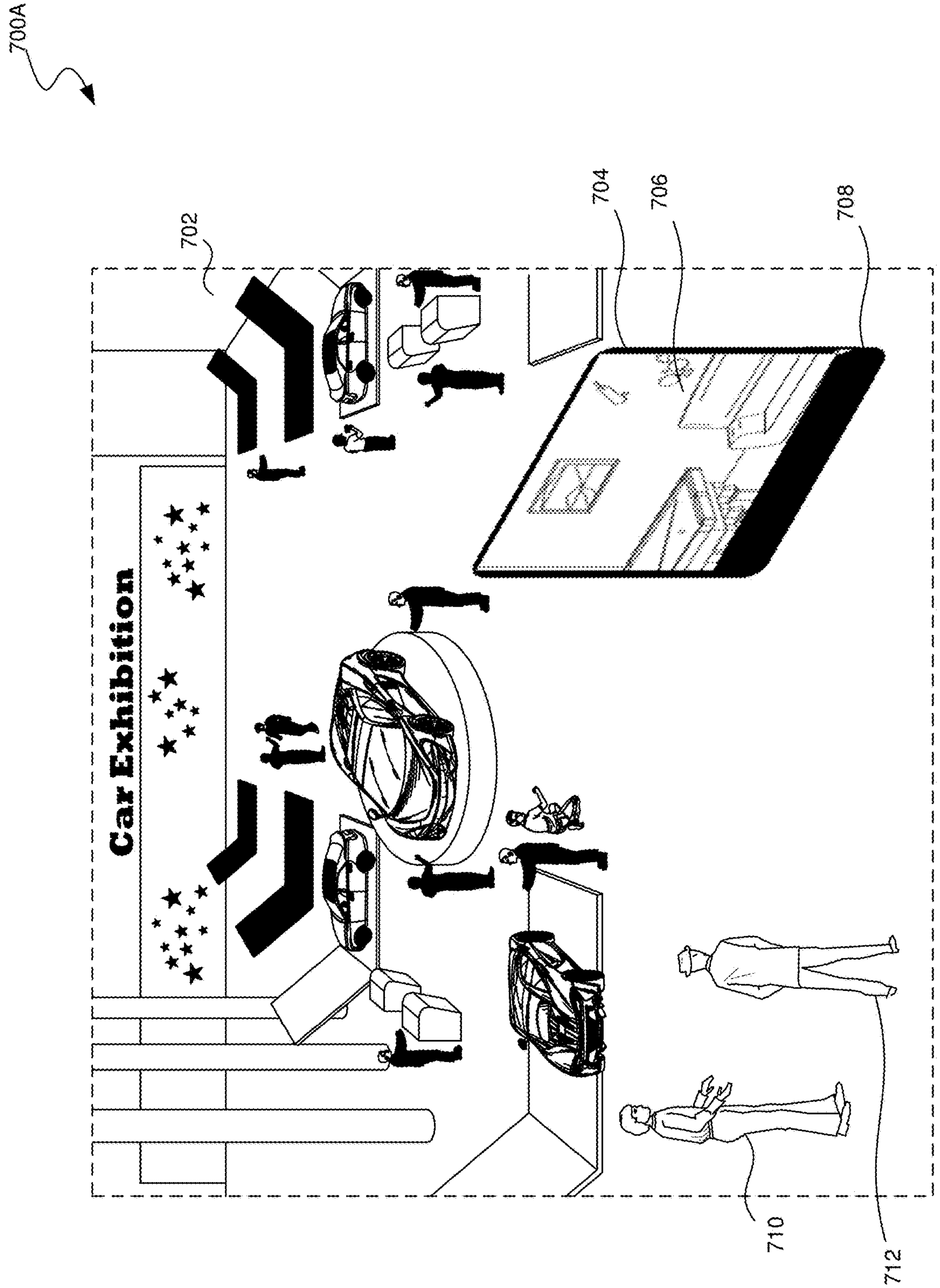
FIG. 7A is a conceptual diagram illustrating an example view including a virtual portal to an artificial reality (XR) destination from within an XR experience.

FIG. 7A is a conceptual diagram illustrating an example view 700A including a portal 704 to an XR destination from within an XR experience 702. View 700A can be from the perspective of a user on an XR device who is accessing XR experience 702. In view 700A, XR experience 702 is a virtual car exhibition that is also being accessed, in a same instance, by users represented by avatars 710, 712 (i.e., a multiplayer experience). Some implementations can assign a same session identifier to the XR devices associated with the user having view 700A and the users associated with avatars 710, 712. Some implementations can assign the same session identifier based on a previously and/or explicitly formed party including the users, based on a mutual relationship of the users, based on the users' access to the same instance of XR experience 702, etc.

Some implementations can facilitate display of portal 704 within XR experience 702 in response to a user request to generate the virtual portal via a menu (not shown) listing available XR destinations to which the XR devices within XR experience 702 can request virtual group travel. In some implementations, the menu can include, for example, a button or other selectable element associated with requesting generation of portal 704. Once requested, some implementations can facilitate display of portal 704. Portal 704 can include any graphics and/or text indicative of or associated with the XR destination. In view 700A, portal 704 can include a snapshot 706 of the XR destination (in this example, an XR clubhouse) and a label 708 for the XR destination that can allow the portal 704 to be entered by one or more of the users accessing XR experience 702 (in this case, the XR device having view 700A and the XR devices associated with avatars 710, 712). Some implementations can assign the same session identifier based on the users who access portal 704, e.g., the user having view 700A and the users associated with avatars 710, 712.

Figure 7B:
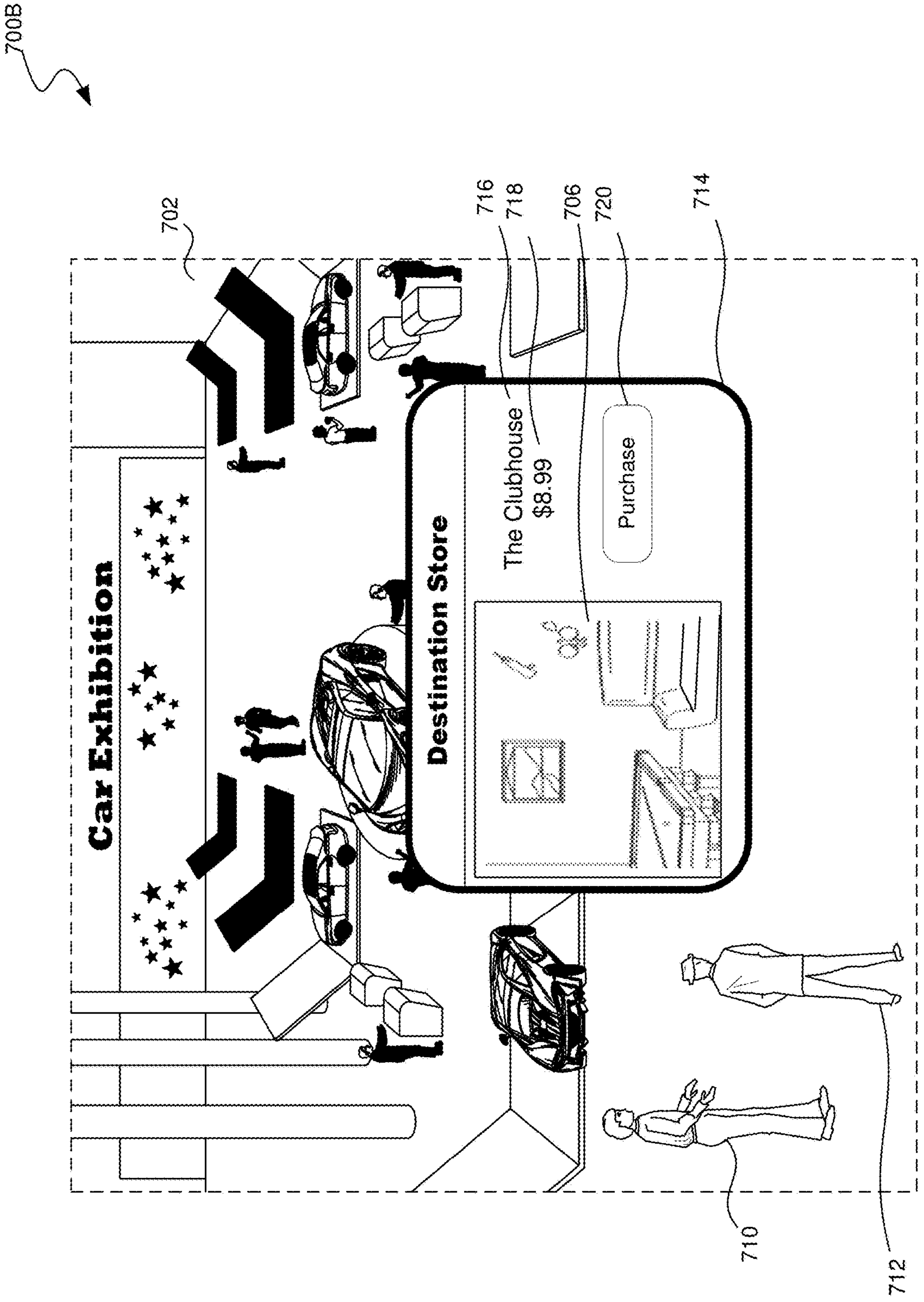
FIG. 7B is a conceptual diagram illustrating an example view including an artificial reality (XR) overlay page to acquire access rights to an XR destination from within an XR experience.

FIG. 7B is a conceptual diagram illustrating an example view 700B including an XR overlay page 714 to acquire access rights to an XR destination from within an XR experience 702. View 700B can be from the perspective of a user on an XR device who is accessing XR experience 702 (e.g., the same user who had view 700A). Some implementations can facilitate display of XR overlay page 714 on the XR device in response to a user traveling through portal 704 to initiate travel to the XR destination (i.e., an XR clubhouse), and upon determination that the XR device displaying view 700A does not have access rights to the XR destination. In some implementations, XR overlay page 714 can include, for example, a name 716 of the XR destination (i.e., "The Clubhouse"), a description of the XR destination (not shown), a cost 718 to acquire access rights to the XR destination, a snapshot 706 of the XR destination, and/or a selectable element 720 presenting an option to acquire access rights to the XR destination (e.g., to purchase access rights to the XR destination). Upon selection of selectable element 720, some implementations can allow the XR device displaying view 700B (or another element of an XR system in operable communication with the XR device displaying view 700B) to download and/or install and application associated with the XR destination.

Figure 7C:
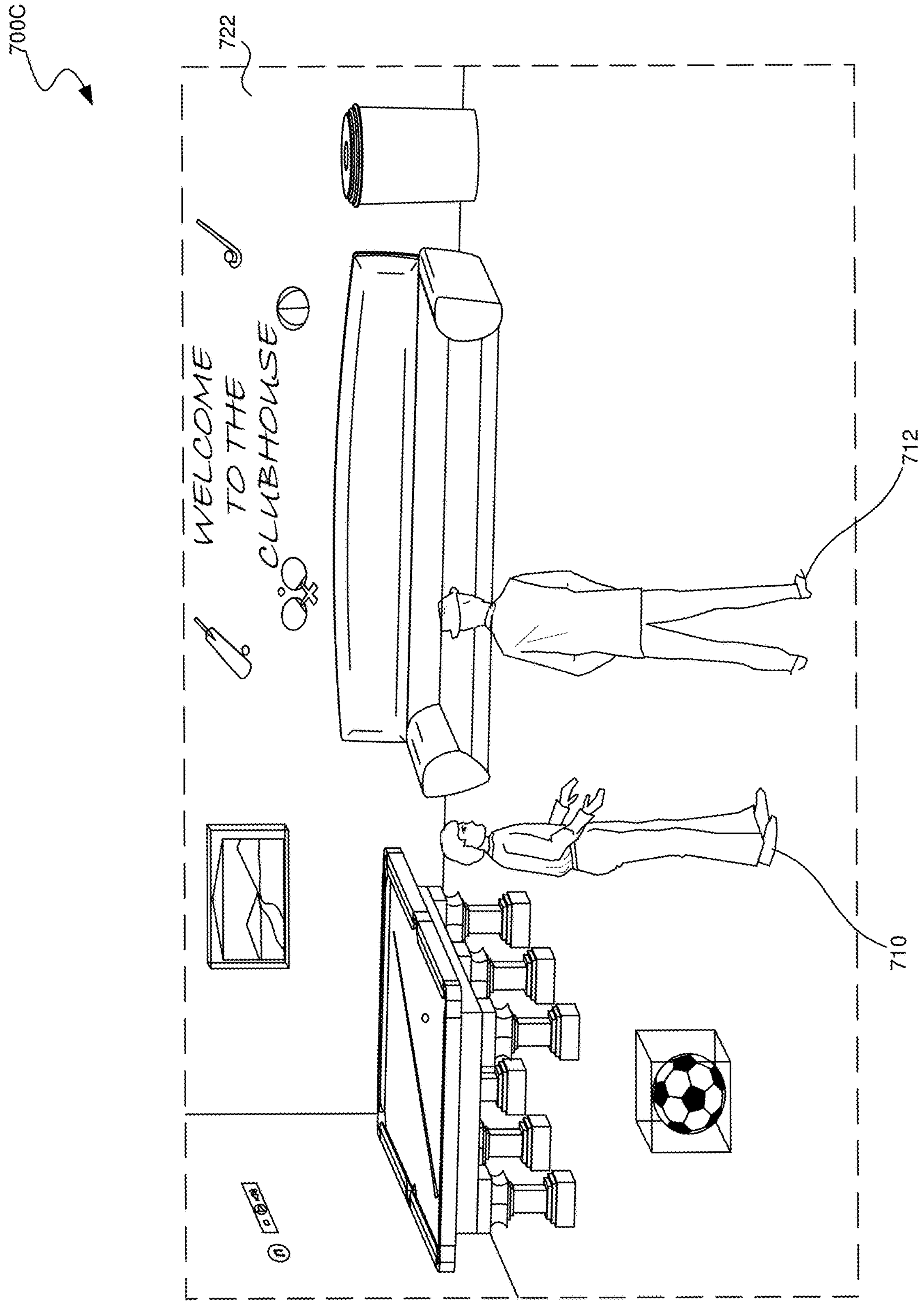
FIG. 7C is a conceptual diagram illustrating an example view of an artificial reality (XR) destination to which a group of users traveled together from an XR experience.

FIG. 7C is a conceptual diagram illustrating an example view 700C of an XR destination 722 to which a group of users traveled together from XR experience 702. View 700C can be from the perspective of a user on an XR device who has traveled to XR destination 722 (e.g., the same user who had view 700A and/or view 700B). Upon entering portal 704 (and upon acquisition of access rights by the user having view 700B), some implementations can transmit the session identifier corresponding to the group of users (i.e., the user having view 700C, the user associated with avatar 710, and the user associated with avatar 712) to a hosting computing device associated with XR destination 722. The hosting computing device can provide virtual group travel to XR destination 722 by the XR device associated with the user having view 700C and the XR devices associated with other users in the same instance of XR experience 702 (represented by avatars 710, 712), based on the assigned session identifier.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method comprising:

associating an identifier with multiple artificial reality devices, wherein the multiple artificial reality devices interact within an instance of an artificial reality experience;

receiving an input to initiate travel to an artificial reality destination;

determining that a first artificial reality device, of the multiple artificial reality devices, does not have access rights to the artificial reality destination;

in response to the determination with respect to the first artificial reality device, pausing a transition of the first artificial reality device from the instance of the artificial reality experience to an instance of the artificial reality destination;

receiving an indication of access rights, to the artificial reality destination, associated with the first artificial reality device; and in response to receiving the indication with respect to the first artificial reality device, based at least in part upon the identifier, permitting the first artificial reality device to transition from the instance of the artificial reality experience to the instance of the artificial reality destination.

2. The method of claim 1, wherein the artificial reality experience is associated with a first developer, and the artificial reality destination is associated with a second developer different from the first developer.

3. The method of claim 1, wherein the artificial reality destination is associated with a game.

4. The method of claim 3, wherein the artificial reality destination is associated with a level within the game.

5. The method of claim 1, the received input is associated with an interaction with a portal in the instance of the artificial reality experience.

6. The method of claim 1, wherein the identifier corresponds to a group of artificial reality users, and each user, of the group of artificial reality users, corresponds a respective artificial reality device of the multiple artificial reality devices.

7. The method of claim 1, wherein a respective input to initiate travel to the artificial reality destination is received from each device of the multiple artificial reality devices.

8. The method of claim 1, wherein the artificial reality destination is hosted by a hosting computing system, and the hosting computing system provides content associated with the instance of the artificial reality destination to each of the multiple artificial reality devices.

9. The method of claim 1, further comprising:

providing, on the first artificial reality device, an option to acquire access rights to the artificial reality destination, wherein the indication of access rights is received in response to a selection of the option.

10. The method of claim 1, further comprising:

determining that a second artificial reality device, of the multiple artificial reality devices, has access rights to the artificial reality destination; and in response to the determination with respect to the second artificial reality device, based at least in part upon the identifier, permitting the second artificial reality device to transition from the instance of the artificial reality experience to the instance of the artificial reality destination.

11. A non-transitory computer-readable storage medium storing instructions that, when executed by a computing system, cause the computing system to:

associate an identifier with multiple artificial reality devices, wherein the multiple artificial reality devices interact within an instance of an artificial reality experience;

receive an input to initiate travel to an artificial reality destination;

determine that a first artificial reality device, of the multiple artificial reality devices, does not have access rights to the artificial reality destination;

in response to the determination with respect to the first artificial reality device, pause a transition of the first artificial reality device from the instance of the artificial reality experience to an instance of the artificial reality destination;

receive an indication of access rights, to the artificial reality destination, associated with the first artificial reality device; and in response to receiving the indication with respect to the first artificial reality device, based at least in part upon the identifier, permit the first artificial reality device to transition from the instance of the artificial reality experience to the instance of the artificial reality destination.

12. The non-transitory computer-readable storage medium of claim 11, wherein the artificial reality experience is associated with a first developer, and the artificial reality destination is associated with a second developer different from the first developer.

13. The non-transitory computer-readable storage medium of claim 11, the received input is associated with an interaction with a portal in the instance of the artificial reality experience.

14. The non-transitory computer-readable storage medium of claim 11, wherein the instructions, when executed, further cause the computing system to:

provide, on the first artificial reality device, an option to acquire access rights to the artificial reality destination, wherein the indication of access rights is received in response to a selection of the option.

15. The non-transitory computer-readable storage medium of claim 11, wherein the instructions, when executed, further cause the computing system to:

determine that a second artificial reality device, of the multiple artificial reality devices, has access rights to the artificial reality destination; and in response to the determination with respect to the second artificial reality device, based at least in part upon the identifier, permit the second artificial reality device to transition from the instance of the artificial reality experience to the instance of the artificial reality destination.

16. A computing system comprising:

one or more processors; and one or more memories storing instructions that, when executed by at least one of the one or more processors, cause the computing system to:

associate an identifier with multiple artificial reality devices, wherein the multiple artificial reality devices interact within an instance of an artificial reality experience;

receive an input to initiate travel to an artificial reality destination;

determine that a first artificial reality device, of the multiple artificial reality devices, does not have access rights to the artificial reality destination;

in response to the determination with respect to the first artificial reality device, pause a transition of the first artificial reality device from the instance of the artificial reality experience to an instance of the artificial reality destination;

receive an indication of access rights, to the artificial reality destination, associated with the first artificial reality device; and in response to receiving the indication with respect to the first artificial reality device, based at least in part upon the identifier, permit the first artificial reality device to transition from the instance of the artificial reality experience to the instance of the artificial reality destination.

17. The computing system of claim 16, wherein the artificial reality experience is associated with a first developer, and the artificial reality destination is associated with a second developer different from the first developer.

18. The computing system of claim 16, the received input is associated with an interaction with a portal in the instance of the artificial reality experience.

19. The computing system of claim 16, wherein the instructions, when executed, further cause the computing system to:

provide, on the first artificial reality device, an option to acquire access rights to the artificial reality destination, wherein the indication of access rights is received in response to a selection of the option.

20. The computing system of claim 16, wherein the instructions, when executed, further cause the computing system to:

determine that a second artificial reality device, of the multiple artificial reality devices, has access rights to the artificial reality destination; and in response to the determination with respect to the second artificial reality device, based at least in part upon the identifier, permit the second artificial reality device to transition from the instance of the artificial reality experience to the instance of the artificial reality destination.

* * * * *